United States Patent [19] [11] Patent Number: 4,985,965
Leavitt [45] Date of Patent: Jan. 22, 1991

[54] FISH PROCESSING UNIT

[76] Inventor: Joseph Leavitt, 2003 Bayview Heights Dr., San Diego, Calif. 92106

[21] Appl. No.: 466,080

[22] Filed: Jan. 16, 1990

[51] Int. Cl.$^5$ ............................................. A22C 25/14
[52] U.S. Cl. ....................................... 17/61; 452/162; 452/152; 452/135
[58] Field of Search .................. 17/61, 55, 57, 52, 62, 17/50, 56

[56] References Cited

U.S. PATENT DOCUMENTS

| | | | |
|---|---|---|---|
| 1,080,982 | 12/1913 | Knapp | 17/64 |
| 3,729,775 | 5/1973 | McDonald | 17/62 |
| 3,769,903 | 11/1973 | Greider | 17/62 |
| 4,236,275 | 12/1980 | Westerdahl | 17/57 |

FOREIGN PATENT DOCUMENTS 1936653 2/1970 Fed. Rep. of Germany .......... 17/57

Primary Examiner—Willis Little
Attorney, Agent, or Firm—Charles C. Logan, II

[57] ABSTRACT

A fish processing unit for longitudinally quartering a fish during a single pass through the unit. A fish is laid on its side and longitudinally oriented in alignment with the direction of travel of a conveyor belt. The conveyor belt passes over the top surface of a front table assembly, then into a fish quartering assembly, and then on to the top surface of a rear table assembly. Within the interior of the fish quartering assembly are mounted a plurality of circular blades that are driven by hydraulic motors. Two of the circular blades are vertically oriented in the same plane with one spaced above the other a predetermined height H1. Two other pairs of horizontally oriented circular blades have their inner edges aligned with each other and they are positioned to the respective sides of the vertically oriented circular blades. What starts out as a whole fish exits the fish quartering assembly in four quarter pieces and a throw portion that includes the backbone of the fish. The quarter pieces of fish are then passed over the top surface of the fish skinner unit with the fish skin positioned on its bottom surface. A single pass removes the skin.

7 Claims, 3 Drawing Sheets

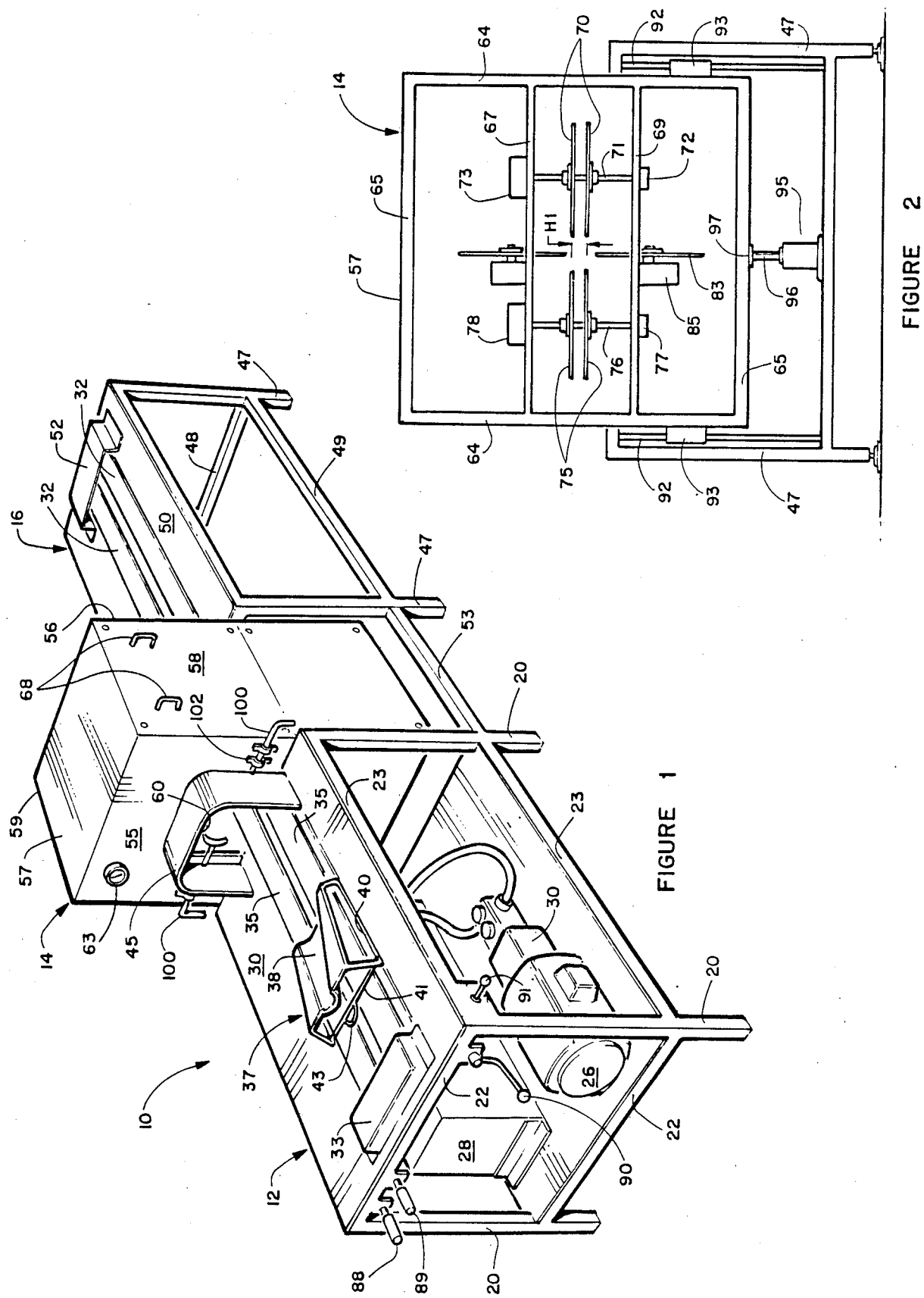

FISH PROCESSING UNIT

BACKGROUND OF THE INVENTION

The invention relates to fish processing and more specifically to a method and apparatus for cleaning fish.

Presently commercial fishermen when fishing with purse nets gather the nets close to their ship and empty the catch onto the deck of the ship. The fish are then sorted and stored in refrigerated storage areas until the ship goes into port. In port the frozen fish are unloaded and processed for sale. The fish are sometimes skinned and filleted before they are sold.

Often a substantial portion of the fish, such as the head, tail, skin, and backbone are not commercially marketable. Therefore when a fish is stored in an unprocessed state, the unuseable parts are a costly waste of space in the refrigerated chamber.

It is an object of the invention to provide a novel fish processing unit on a commercial fishing boat that processes the fish immediately after they are caught and then discards unusable parts and freezing the saleable portions.

It is also an object of the invention to provide a novel fish processing unit that receives a whole fish at one end and it exits the other end in four quarters, including the backbone as waste or a discard portion.

It another object of the invention to provide a novel method of processing a whole fish that utilizes a fish skinner unit that allows a quarter portion of a fish with skin on its outer surface to be transported across the top of the fish skinner unit in a single pass to remove the skin.

It is an additional object of the invention to provide a novel fish processing unit for longitudinally quartering a fish during a single pass through the unit that is economical to manufacture and market.

It is a further object of the invention to provide a novel fish skinner unit that is economical to manufacture and market.

SUMMARY OF THE INVENTION

Applicant's new method for commercial fisherman to process a whole fish involves two novel units. One of these is a fish processing unit for longitudinally quartering a fish during a single pass through the unit. The second unit is a fish skinner unit for removing the skin from each of the quarters of the fish.

The fish processing unit for quartering a fish has been designed to be used with fish weighing approximately twenty pounds to one hundred forty pounds. Immediately after the fish are hauled onto the commercial ship deck, they are laid head first on one of their sides so they longitudinally align with the conveyor belt of the fish processing unit. The rear or tail of the fish is placed upon a tray having a forward downward tilt to keep the backbone of the fish in a horizontal orientation. Once the power source for the conveyor belt is actuated, the whole fish travels forward across the front table assembly and into the entry port of the fish quartering assembly. Within the fish quartering assembly are six circular blades oriented in such a manner that as the fish is transported therethrough, the fish will be cut into four quarters and a throwaway portion that includes the backbone of the fish. The fish quartering assembly has structure for vertically raising and lowering it so that the respective circular blades are oriented at a proper height for the size of fish being processed. Alignment rods adjacent the front wall of the fish quartering assembly also aid in centering the fish as it travels into the fish quartering assembly.

The source of power for operating the fish processing unit is a water proof motor that drives a hydraulic pump. The pump would connected to various hydraulic motors that would be used to power the respective circular blades, drive the conveyor, and raise and lower the fish quartering assembly. The table assemblies and the housing of the fish quartering assembly are all made of stainless steel due to the nature of the environment in which the unit is used.

The fish skinner unit has a top panel having a pair of cutout slots formed therein. A pair of planar blades have their top edges extending upwardly through these respective cutout slots so that a quarter piece of a fish being transported thereover will have the skin removed in a single pass. The metal frame members and the panels would also be preferrably made of stainless steel.

DESCRIPTION OF THE DRAWINGS

FIG. 1 is a front perspective view of applicant's novel fish processing unit;

FIG. 2 is a cross sectional view taken along lines 2—2 of FIG. 3;

DESCRIPTION OF THE PREFERRED EMBODIMENT

Figure 3:
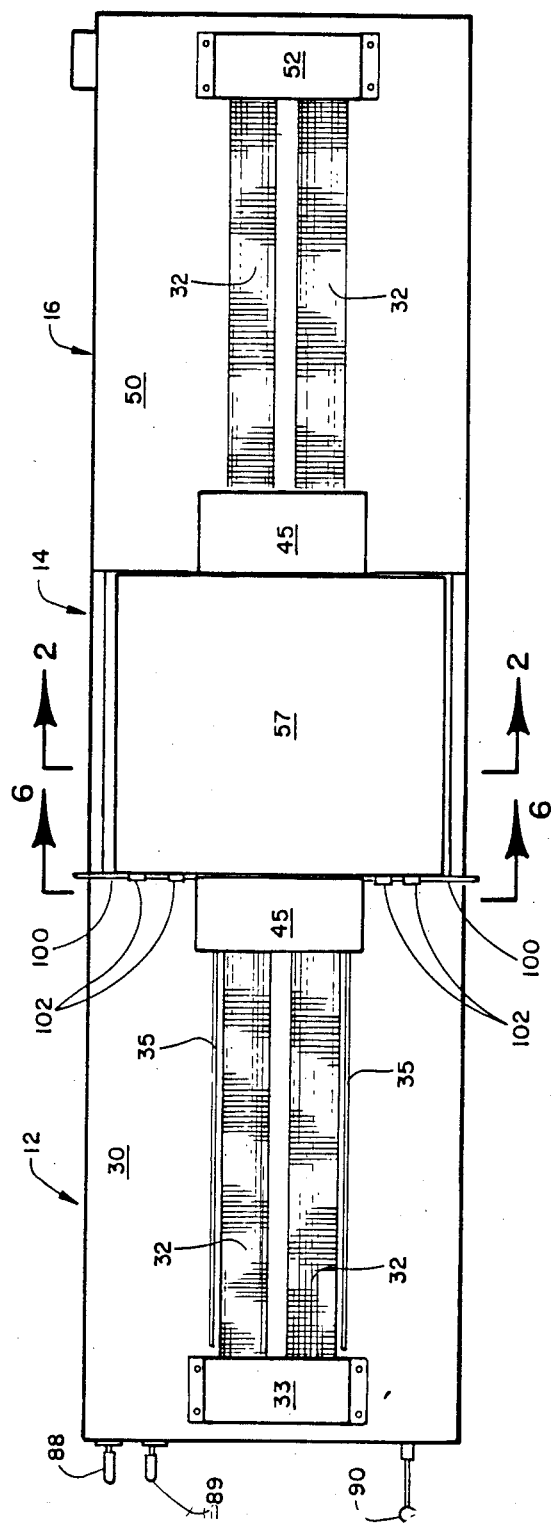
FIG. 3 is a top plan view of the fish processing unit.
Figure 4:
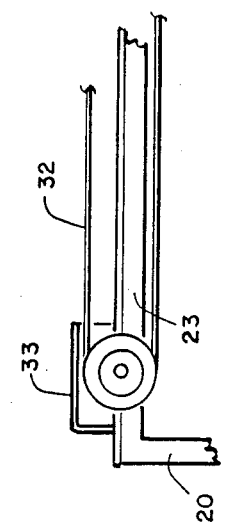
FIG. 4 is a partial side elevation view of the front table assembly.

Applicant's novel method of processing a whole fish and the structure of his fish processing unit and his fish skinner unit will now be described by referring to FIGS. 1–8 of the drawings.

Fish processing unit 10 is formed from a front table assembly 12, a fish quartering assembly 14, and a rear table assembly 16. Fish skinner unit 18 would be positioned in a location adjacent the fish processing unit 10.

Front table assembly 12 has a plurality of vertical legs 20 connected together by cross members 22 and frame members 23. A support panel 25 has a water proof motor 26 and a hydraulic fluid reservoir 28 mounted thereon. A hydraulic fluid pump 30 is connected to reservoir 28 and also to a multiple number of hydraulic motors in a conventional manner (not shown). Top panel 30 has a pair of closed loop conveyor belts 32 mounted thereon. A safety cover 33 protects the front end of the conveyor belts. Guide channels 35 are positioned adjacent the outside edges of the respective conveyor belts. A tray 37 has a top panel 38 inclined to support the tail of the fish so that the backbone of the fish will remain in a substantially horizontal position. Support legs 40 of tray 37 travel in channels 35. Cross member 41 rests on conveyor belts 32 to cause the tray to travel therealong. A handle 43 is connected to cross member 41. The forward travel of tray 37 is limited by stop members located at the rear end of front table assembly 12. A hood 45 is attached to top panel 30 and its purpose is to prevent a worker from inadvertantly reaching into the fish quartering assembly and severing a hand or finger.

Rear table assembly 16 has a plurality of vertical legs 47. They are connected together by cross members 48 and frame members 49. A top panel 50 has a cover 52 mounted thereon for hiding the end of conveyor belt 32. Frame members 53 connects front table assembly 12 to rear table assembly 16.

Fish quartering assembly 14 has a front wall 55, a rear wall 56, a top wall 57, and removable side walls 58 and 59. An entry port 60 is formed in front wall 55 and an exit port 62 is formed in rear wall 56. A hydraulic pressure gage 63 is mounted on front wall 55. Handles 68 are mounted on the respective side walls 51 and 59 for lifting and removing the housing in order to wash and clean the blades.

The structure of fish quartering assembly 14 is formed from a plurality of vertical frame members 64 and cross members 65. Upper support panel 67 and lower support panel 69 are supported between vertical frame members 64. Circular blades 70 are mounted on a shaft 71 whose bottom end is supported in bearing blocks 72 and whose top end is connected to hydraulic motor 73. Circular blades 75 are mounted on a shaft 76 whose bottom end is captured in bearing block 77 and whose top end is attached to hydraulic motor 78. Circular blade 80 is mounted on a shaft extending from hydraulic motor 81. Circular blade 83 is mounted on a shaft extending from hydraulic motor 85. The respective hydraulic motors are connected by hose to pump 30 in a conventional manner. Control handles 88 and 89 are used to control the direction of rotation of the respective blades. Control handle 91 is very important as it controls the speed of all the blades.

Control handle 90 is used to raise and lower fish quartering assembly 14. This is accomplished by bearing blocks 93 that ride up and down rods 92. The driving force is a hydraulic jack 95 having a shaft 96 and a top support member 97. Jack 95 would be connected to hydraulic pump 30 in a conventional manner. Alignment rods 100 have curved gripping members on their forward ends for centering the fish on the conveyor belt 32. The alignment rods pass through and are mounted in brackets 102.

Figure 5:
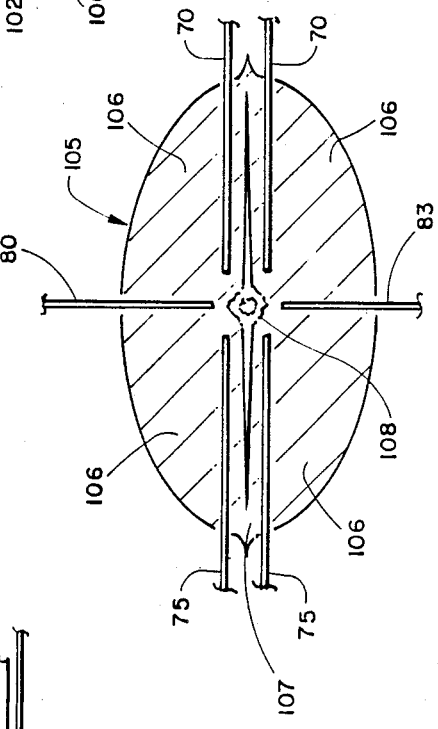
FIG. 5 is a schematic cross sectional view illustrating how the fish is cut into its various parts.
Figure 6:
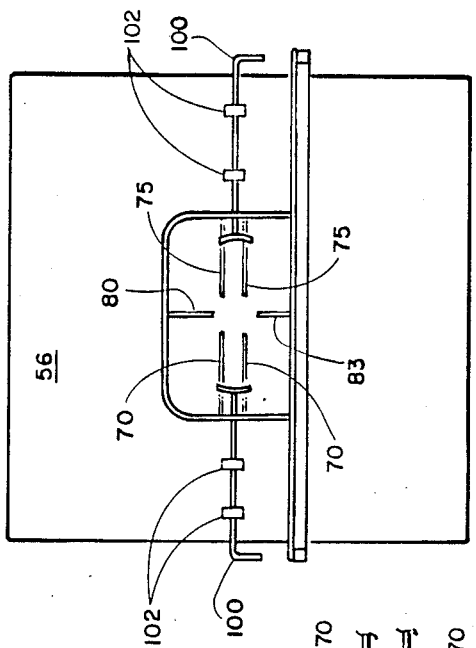
FIG. 6 is a cross sectional view taken along lines 6—6 of FIG. 2.
Figure 8:
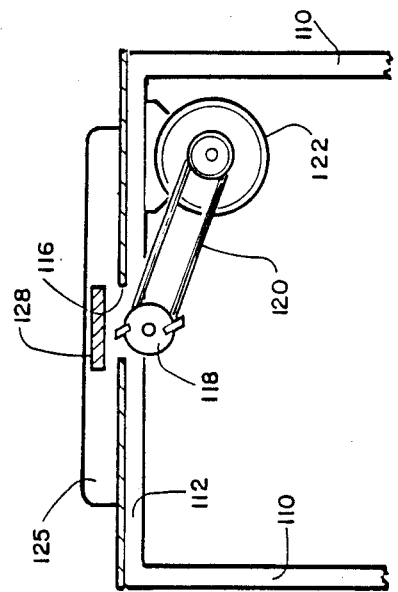
FIG. 8 is a partial cross sectional elevation view of the fish skinner unit.
Figure 7:
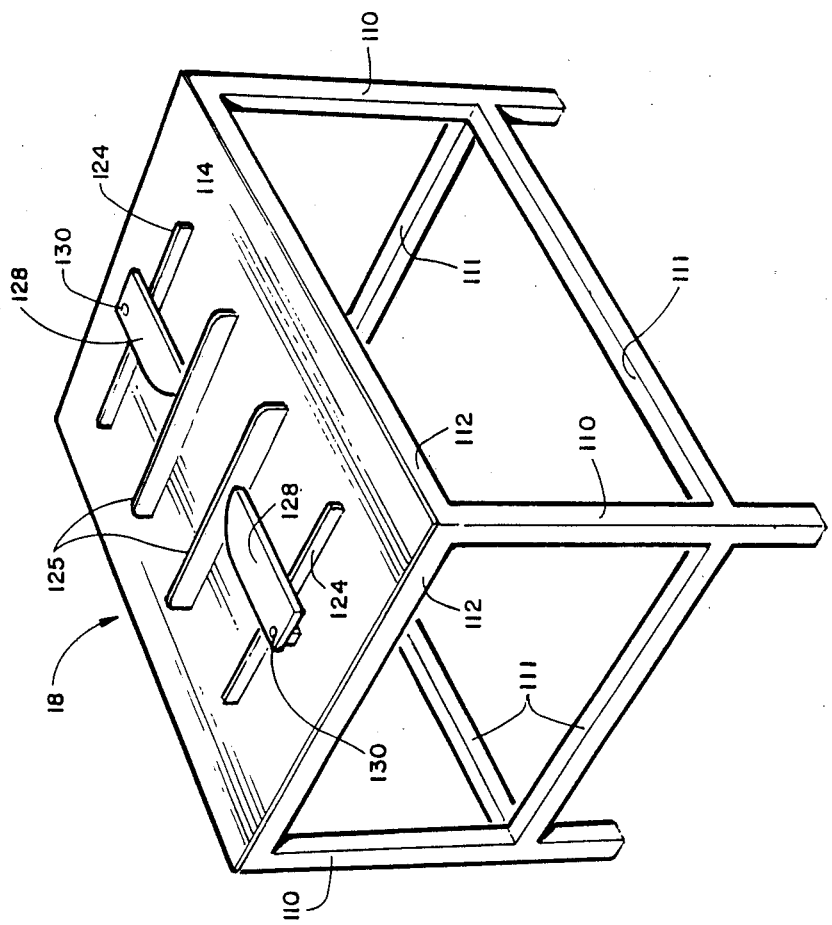
FIG. 7 is a front perspective view of the fish skinner unit.

In FIG. 5, a schematic illustration shows how a fish 105 is cut into quarter pieces 106 and a throwaway portion 107 having a backbone 108.

Fish skinner unit 18 has a plurality of vertical legs 110 connected together by lower frame members 111 and upper frame members 112. Top panel 14 has a pair of cutout slots 116 formed therein. The top edge of a planar blade 118 extends a predetermined height above cutout slot 116. It is driven by a belt 120 and motor 122. Guides 124 and 125 are mounted on top panel 118. A safety arm panel 128 is also pivotally mounted on pins 130.

What is claimed is:

1. A fish processing unit for longitudinally quartering a fish during a single pass through said unit comprising:
    a front table assembly having a front end, a rear end and a top panel, said front table assembly having a longitudinally extending axis;
    a rear table assembly having a front end, a rear end and a top panel, aid rear table assembly having a longitudinally extending axis that coincides with the longitudinal axis of said front table assembly;
    the front end of said rear table assembly is positioned a predetermined distance from the rear end of said front table assembly, a fish quartering assembly is positioned in this area;
    said fish quartering assembly having a front wall having an entry port, a rear wall having an exit port, a pair of vertically oriented circular blades both mounted in the same vertical plane but one spaced above the other a predetermined height H1, a first pair of horizontally oriented circular blades both mounted in the same horizontal plane and having their adjacent edges spaced a predetermined distance from each other and each of them also being on opposite sides of said pair of vertically oriented circular blades;
    means for rotating all of said circular blades;
    conveyor means for transporting a whole fish from said front table assembly through the entry and exit ports of said fish quartering assembly and then on to said rear table assembly comprising a pair of laterally spaced closed looped belts that are supported on the top panels of said front and rear table assemblies, the belts are oriented so they pass on opposite sides of said vertically oriented blades; and
    a pair of longitudinally extending tray guide channels on the top panel of said front table assembly, said tray guide channels being on opposite lateral sides of said conveyor means.

2. A fish processing unit as recited in claim 1 further comprising a tray for supporting the tail of a fish being conveyed through said fish quartering assembly, said tray having a pair of laterally spaced support legs that ride in said tray guide channels.

3. A fish processing unit for longitudinally quartering a fish during a single pass through said unit comprising:
    a front table assembly having a front end, a rear end and a top panel, said front table assembly having a longitudinally extending axis;
    a rear table assembly having a front end, a rear end and a top panel, said rear table assembly having a longitudinally extending axis that coincides with the longitudinal axis of said front table assembly;
    the front end of said rear table assembly is positioned a predetermined distance from the rear end of said front table assembly, a fish quartering assembly is positioned in this area;
    said fish quartering assembly having a front wall having an entry port, a rear wall having an exit port, a pair of vertically oriented circular blades both mounted in the same vertical plane but one spaced above the other a predetermined height h1, a first pair of horizontally oriented circular blades both mounted in the same horizontal plane and having their adjacent edges spaced a predetermined distance from each other and each of them also being on opposite sides of said pair of vertically oriented circular blades;
    means for rotating all of said circular blades; and
    means for raising and lowering the height of said fish quartering assembly in response to different sizes of fish.

4. A fish processing unit as recited in claim 3 wherein said means for raising and lowering said quartering assembly comprises two vertically oriented rods attached to the rear end of said front table assembly, two vertically oriented rods attached to the front end of said rear table assembly, a bearing block mounted on each of said rods, said bearing blocks being attached to said fish quartering assembly at predetermined locations.

5. A fish processing unit as recited in claim 3 further comprising means for rigidly connecting said front table assembly to said rear table assembly.

6. A fish processing unit as recited in claim 3 further comprising a hood extending outwardly from the front wall of said fish quartering assembly to prevent a worker from being able to reach a hand into said circular blades.

7. A fish processing unit as recited in claim 3 further comprising a second pair of horizontally oriented circular blades both mounted in the same horizontal plane and having their adjacent edges spaced a predetermined distance from each other and each of them also being on opposite sides of said pair of vertically oriented circular blades, said first and second pair or horizontally oriented circular blades being spaced a predetermined vertical distance from each other.

* * * * *